No. 807,247. PATENTED DEC. 12, 1905.
E. S. CLAYTON.
AUTOMATIC SPRINKLER HEAD.
APPLICATION FILED APR. 12, 1905.

Witnesses

Inventor
Ernest S. Clayton,
by Miller, Freeman & Watson
Attorneys

UNITED STATES PATENT OFFICE.

ERNEST S. CLAYTON, OF NEWARK, NEW JERSEY.

AUTOMATIC SPRINKLER-HEAD.

No. 807,247.  Specification of Letters Patent.  Patented Dec. 12, 1905.

Application filed April 12, 1905. Serial No. 255,141.

*To all whom it may concern:*

Be it known that I, ERNEST S. CLAYTON, a citizen of the United States, residing at Newark, in the county of Essex and State of New Jersey, have invented certain new and useful Improvements in Automatic Sprinkler-Heads, of which the following is a specification.

My invention relates to stop-valves, and more especially to that class of stop-valves in which the plug or gate is carried to and from a seat formed about an opening in a plate and is normally retained in position to close the said opening, as in the case of valve devices of automatic sprinklers; and my invention consists of a valve device having a valve and seat of a peculiar construction, as fully set forth hereinafter and as illustrated in the accompanying drawings, in which—

Figure 1:
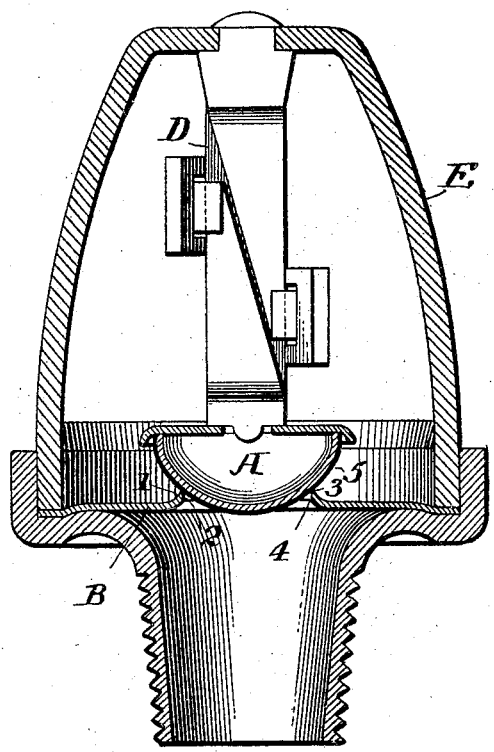
Figure 2:
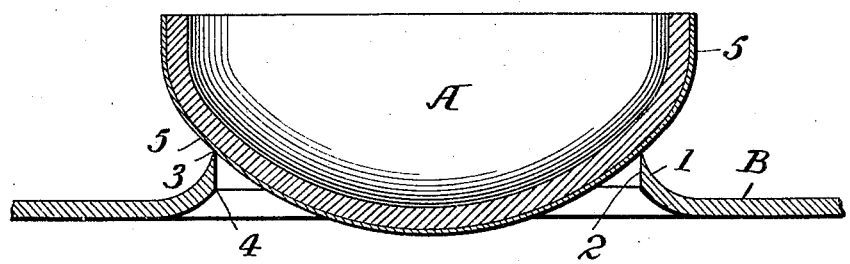

Figure 1 is a sectional elevation of a sprinkler-head provided with my improved valve device. Fig. 2 is an enlarged sectional view showing the valve and the seat therefor.

My improvements may be employed in connection with valve devices of different constructions. I have illustrated a construction and arrangement specially adapted for a stop-valve such as is employed in automatic fire-extinguishers, where the valve is held to its seat by a strut D, bearing against the valve and against a bearing of a yoke E.

The valve A consists of a thin metal cup presenting exteriorly a rounded somewhat semispherical face. I apply to the surface of this cup a coating 5 of vitreous composition or enamel. The completed valve, being formed of thin metal with a fused thin coat of vitreous enamel having practically the same coefficient of expansion as the metal upon which it is fused, will expand and contract in the same ratio with any change in temperature, and therefore the vitreous-enamel coating will remain intact and not crack or flake off, and a uniform unbroken valve-face is thus maintained.

Solid valves have heretofore been proposed with a coating of vitreous enamel, but are open to the objection that it is difficult to apply to the metal a thin coating of vitreous enamel that will expand and contract in the same ratio, and hence the enamel will crack or flake off, so that the result is a valve less effective than one without any coating. As will be readily understood, a valve having the face coated with enamel will not present so regular a surface unless the enameled face is ground as a metal valve, the face of which is finished in a lathe, as usual, and I therefore provide a seat for the valve, which is a knife-edge seat materially less in diameter than the valve and formed upon a plate B, having an opening opposite the valve, which opening is surrounded by a flange having a knife-edge, the rounded face of the valve extending into the opening and across the said edge and exerting a pressure both downward and radially against the said edge, which will flare or spring sufficiently to insure a tight joint at all points. In the construction shown the flange is formed by turning up the edge of the metal around the opening, imparting to the flange an inclined outer face or wall 1 and an inner face or wall 2, which is perpendicular to the plane of the plate. In constructing a valve-seat of this character the plate or sheet is subjected to dies, which form a cup-shaped depression with an edge turned through ninety degrees on an arc of about one-tenth of an inch, and the plate is then bored through so as to remove the bottom of this cup-shaped portion and form the inner wall 2 of equal diameter from the outer edge 3 to the inner edge 4.

The flange around the opening in the plate not only presents the seat as described, but reinforces the plate, imparting additional stiffness and preventing it from yielding to an undue extent under the pressure of the valve.

While the plate B may be of any suitable material, it is preferably of nickel or other non-oxidizible metal or composition.

I do not herein claim the construction of the strut shown herein and claimed in my copending application, Serial No. 255,142.

Without limiting myself to the precise construction and arrangement of parts shown, I claim as my invention—

1. In a stop-valve, the combination of an annular valve-seat, and a plug consisting of a cup of thin metal having a vitreous coating, substantially as set forth.

2. In a stop-valve, the combination of a plug and a seat therefor consisting of the flexible edge of an annular flange having an inclined outer face and an inner face of uniform diameter from the outer to the inner edge, substantially as set forth.

3. The combination with the plug of a stop-valve, of a plate having an opening surrounded by a sharpened flexible flange projecting toward the plug and gradually decreasing in thickness toward the edge, substantially as set forth.

4. The combination with the plug of a stop-valve, of a plate having an opening opposite the plug, and an annular flange surrounding said opening, the inner wall of the flange perpendicular to the plane of the plate and the outer wall inclined and meeting the inner wall and forming a flexible sharp-edged seat for the valve, substantially as set forth.

5. In a stop-valve, the combination of a plug and a plate having an opening opposite the plug, the edge of the plate around the opening being shaped to form an annular flexible sharp-edged flange with an inclined outer face and an inner face perpendicular to the plane of the plate, substantially as set forth.

6. In a stop-valve, the combination of a plug having an approximately semispherical face, and a plate having an opening and surrounding flange with a flexible knife-edge seat for the plug, substantially as set forth.

7. In a stop device, the combination of a plug having a rounded face, and a plate having an opening surrounded by a flange with faces meeting at an angle and forming a sharp and yielding knife-edge valve-seat, substantially as set forth.

8. A stop-valve consisting of a cup of thin metal provided with a vitreous coating having substantially the same coefficient of expansion as the metal, substantially as set forth.

In testimony whereof I have signed my name to this specification in the presence of two subscribing witnesses.

ERNEST S. CLAYTON.

Witnesses:
C. A. GARTHWAITE,
FRANK T. STINSON.